United States Patent
Yamada

(10) Patent No.: US 7,354,069 B2
(45) Date of Patent: Apr. 8, 2008

(54) STEERING APPARATUS

(75) Inventor: Jun Yamada, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 400 days.

(21) Appl. No.: 10/980,777

(22) Filed: Nov. 4, 2004

(65) Prior Publication Data

US 2005/0093283 A1 May 5, 2005

(30) Foreign Application Priority Data

Nov. 5, 2003 (JP) .......................... P.2003-375095

(51) Int. Cl.
*B62D 1/18* (2006.01)
(52) U.S. Cl. ........................................ 280/775; 74/493
(58) Field of Classification Search ................ 280/775; 74/493

See application file for complete search history.

(56) References Cited

U.S. PATENT DOCUMENTS

| | | | |
|---|---|---|---|
| 4,648,624 A | 3/1987 | Mouhot et al. | |
| 5,605,351 A | 2/1997 | Higashino | |
| 5,607,184 A | 3/1997 | Barton | |
| 6,139,057 A | 10/2000 | Olgren et al. | |
| 6,467,807 B2 * | 10/2002 | Ikeda et al. ................. | 280/775 |

FOREIGN PATENT DOCUMENTS

| | | |
|---|---|---|
| DE | 100 26 671 A1 | 1/2001 |
| FR | 2 787 842 A | 6/2000 |
| GB | 2 352 286 A | 1/2001 |
| JP | 8-80857 A | 3/1996 |
| JP | 10-512286 A | 12/1998 |
| JP | 2001-191927 A | 7/2001 |
| JP | 2001-347953 A | 12/2001 |
| JP | 2002-59848 A | 2/2002 |
| JP | 2002-59850 A | 2/2002 |
| JP | 2002-87285 A | 3/2002 |
| WO | WO 03/059718 A1 | 7/2003 |
| WO | WO 03/095286 A1 | 11/2003 |

\* cited by examiner

*Primary Examiner*—Ruth Ilan
(74) *Attorney, Agent, or Firm*—Sughrue Mion, PLLC

(57) ABSTRACT

A steering apparatus includes: an inner column which rotatably supports a steering shaft; an outer jacket which incorporates the inner column shiftably in an axial direction, at least a portion of the outer jacket being cylindrical; and an urging member for urging the inner column. The outer jacket includes: a pressed portion which extends in a direction leaving an axial line from the outer periphery of the outer jacket and is urged by the urging member, a slit which extends in the axial direction over the pressed portion from the end of the outer jacket, and a notch which leads to the slit extending over the pressed portion. The notch has a tapered shape which enlarges toward an opening side when the outer jacket is viewed in an urging direction of the urging member.

4 Claims, 14 Drawing Sheets

STEERING APPARATUS

BACKGROUND OF THE INVENTION

1. Field of the Invention

This invention relates to a steering apparatus, and particularly to a tilt-telescopic steering apparatus capable of adjusting the tilting angle of a steering wheel and the position thereof in an axial direction according to the driving posture of a driver.

2. Background Art

A previously known steering apparatus for a motor vehicle is a tilt-telescopic steering capable of the tilting angle of a steering wheel according to the physique and driving attitude of a driver and the axial position of the steering wheel.

Now, in order to assure the space in the vicinity of the knee of the driver, there is an idea of locating the components of the tip-telescopic steering apparatus at a possibly near position to a steering shaft. On the other hand, JP-T-10-512826 (the term "JP-T" as used herein means a published Japanese translation of a PCT patent application) discloses a steering apparatus in which the yoke supporting the steering shaft arranged in an outer column tube is shifted along a vertical groove formed at a pair of bracket segments, thereby adjusting the tilting angle of the steering shaft.

SUMMARY OF THE INVENTION

Meanwhile, according to the above background art, since the yoke is provided between the outer column tube and the steering shaft, in order to realize the telescopic adjustment in this structure, it is necessary to provide an inner column tube having a long hole in an axial direction outside the yoke in the radial direction, separately from the outer column tube. However, the provision of the inner column tube outside the yoke presents a problem of large-scaling of the device. Further, in such a case, a certain gap allowing relative sliding during the adjustment must be provided between the inner column tube and the yoke. If the gap is large, a back-lash may be generated. On the other hand, if the gap is small, the sliding resistance increases. This presents a problem that dimension adjustment of the gap must be strictly carried out. Further, a gap for relative sliding must be provided also between the inner column tube and the outer column tube. This gives rise to the same problem and also increases the labor and time of machining.

In order to solve such a problem, the inventors of this invention have developed a steering apparatus in which an outer jacket incorporating an inner column movably in a direction of the axial line and being at least partially cylindrical is provided and using the friction force acted between its diameter-reduced portion and the inner column is used to fix the inner column. Meanwhile, in order to reduce the diameter of the outer jacket easily by external pressing in a radial direction, a slit is preferably formed on the outer periphery thereof. However, the provision of the slit gives rise to stress concentration on the outer jacket. To obviate such inconvenience, increasing the rigidity of the outer jacket by e.g. increasing the sectional thickness of the outer jacket can be proposed. This, however, presents a new problem that increases in size and weight of the steering apparatus occur and a large operating force is required during tilting.

In view of the problems of the above prior art, this invention has been accomplished, and intends to provide a steering apparatus having an outer jacket with optimized balance of rigidity.

The invention provides a steering apparatus including: an inner column which rotatably supports a steering shaft; an outer jacket which incorporates the inner column shiftably in an axial direction, at least a portion of the outer jacket being cylindrical; and an urging member for urging the inner column; wherein the outer jacket includes: a pressed portion which extends in a direction leaving an axial line from the outer periphery of the outer jacket and is urged by the urging member, a slit which extends in the axial direction over the pressed portion from the end of the outer jacket, and a notch which leads to the slit extending over the pressed portion; and the notch has a tapered shape which enlarges toward an opening side when the outer jacket is viewed in an urging direction of the urging member.

The invention provides a steering apparatus, including: an inner column which rotatably supports a steering shaft; an outer jacket which incorporates the inner column shiftably in an axial direction, at least a portion of the outer jacket being cylindrical; and an urging member for urging the inner column; wherein the outer jacket includes: a pressed portion which extends in a direction leaving an axial line from the outer periphery of the outer jacket and is urged by the urging member, a slit which extends in the axial direction over the pressed portion from the end of the outer jacket, a notch which leads to the slit extending over the pressed portion, and a rib extending in the axial direction on the outer periphery opposite to the slit with respect to the axial line.

The invention provides a steering apparatus for supporting a steering shaft attached to a steering wheel shiftably in an axial direction, including: an inner column which rotatably supports the steering shaft; a pair of bracket segments attached to a vehicle body and arranged at opposite positions with respect to an axial line of the steering shaft; a tension member extended between the pair of bracket segments; two fixing members for fixing the tension member from outside of the pair of bracket segments; a displacement applying member arranged between the tension member and the fixing members for applying a relative displacement between the bracket segments and the fixing members in interlock with a movement of an operating lever; and a cylindrical outer jacket held to the vehicle body by coupling the tension member, the bracket segments and the fixing member and having a flange with an outer periphery to be in contact with the bracket segments by the relative displacement of the bracket segments at least between the pair of bracket segments, and an inner periphery wrapping the outer periphery of the inner column; wherein the pair of bracket segments approach each other by the relative displacement given by the applying member so that a pressing force is given to the inner column through the flange of the outer jacket and the inner column is held at its axial position by the bracket segments through the outer jacket; the outer jacket includes the flange which extends in a direction leaving the axial line from the outer periphery of the outer jacket and is pressed by the pair of bracket segments, a slit which extends in the axial direction from the end of the outer jacket to cross the flange, and a notch which leads to the slit extending over the pressed portion; and the notch has a tapered shape which enlarges toward the opening side when the outer jacket is viewed from the bracket segments.

The invention provides a steering apparatus for supporting a steering shaft attached to a steering wheel shiftably in an axial direction, comprising: an inner column which rotatably supports the steering shaft; a pair of bracket segments attached to a vehicle body and arranged at opposite positions with respect to an axial line of the steering shaft; a tension member extended between the pair of bracket segments; two fixing members for fixing the tension member from outside of the pair of bracket segments; a displacement applying member arranged between the tension member and the firing members for applying a relative displacement between the bracket segments and the fixing members in interlock with a movement of an operating lever; and a cylindrical outer jacket held to the vehicle body by coupling the tension member, the bracket segments and the fixing member and having a flange with an outer periphery to be in contact with the bracket segments by the relative displacement of the bracket segments at least between the pair of bracket segments, and an inner periphery wrapping the outer periphery of the inner column; the pair of bracket segments approach each other by the relative displacement given by the applying member so that a pressing force is given to the inner column through the flange of the outer jacket and the inner column is held at its axial position by the bracket segments through the outer jacket; the outer jacket includes the flange which extends in a direction leaving the axial line from the outer periphery of the outer jacket and is pressed by the pair of bracket segments, a slit which extends in the axial direction from the end of the outer jacket to cross the flange, a notch which leads to the slit extending over the pressed portion, and a rib extending in the axial direction on the outer periphery opposite to the slit with respect to the axial line.

Preferably, assuming that the center of the slit is at an angle of 0° on the section orthogonal to the axial line of the outer jacket, the notch is formed within a range of ±90° from the center of the slit.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
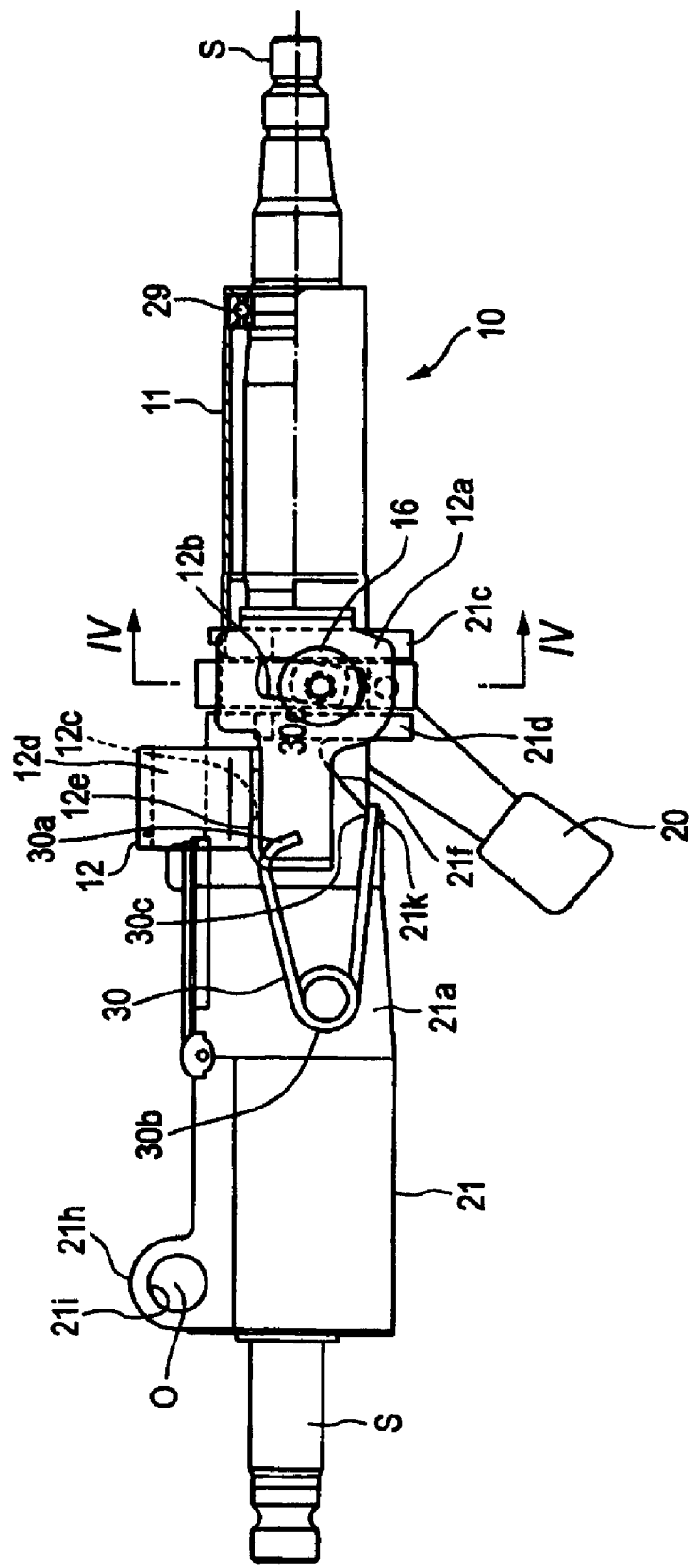
FIG. 1 is a side view of a tilt-telescopic steering apparatus according to an embodiment of this invention.
Figure 2:
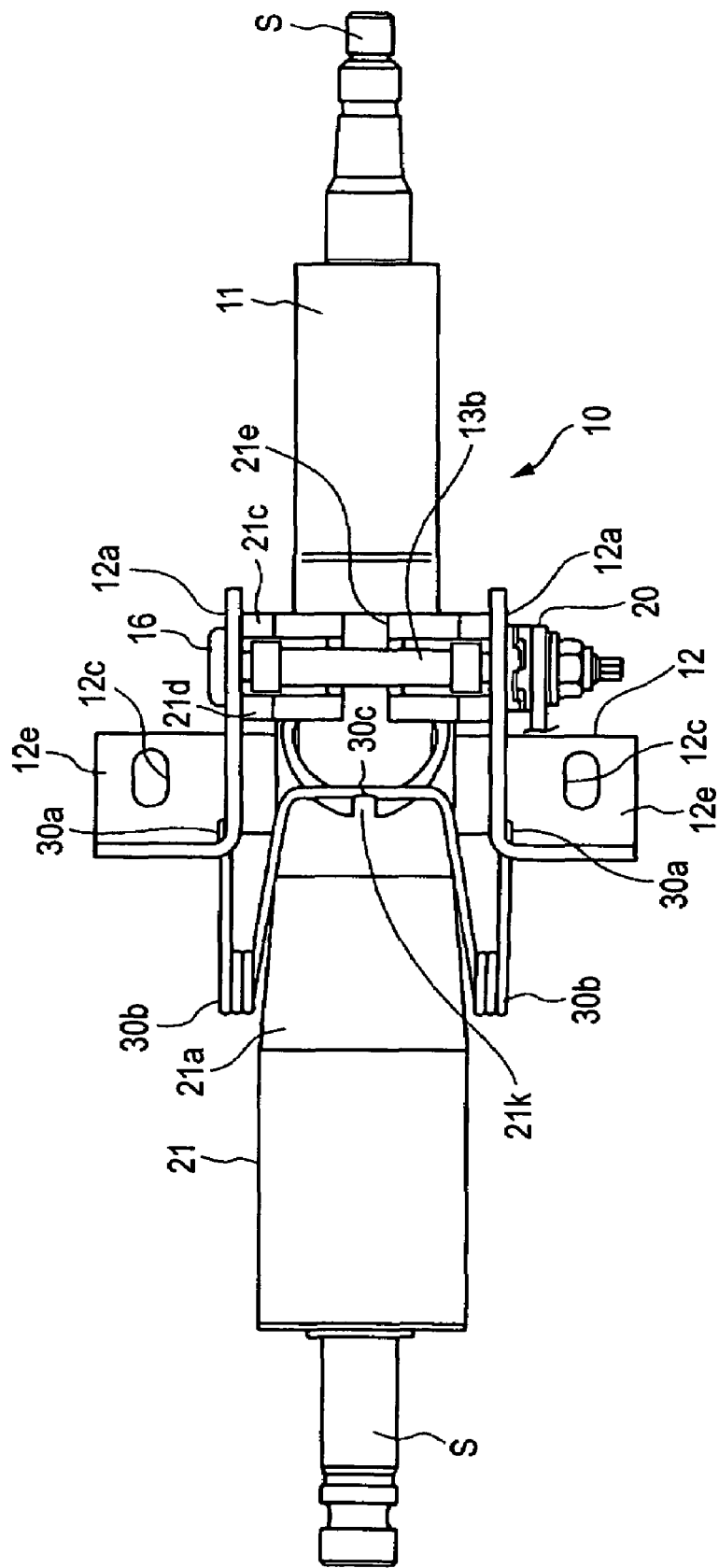
FIG. 2 is a bottom view of the steering apparatus shown in FIG. 1.
Figure 3:
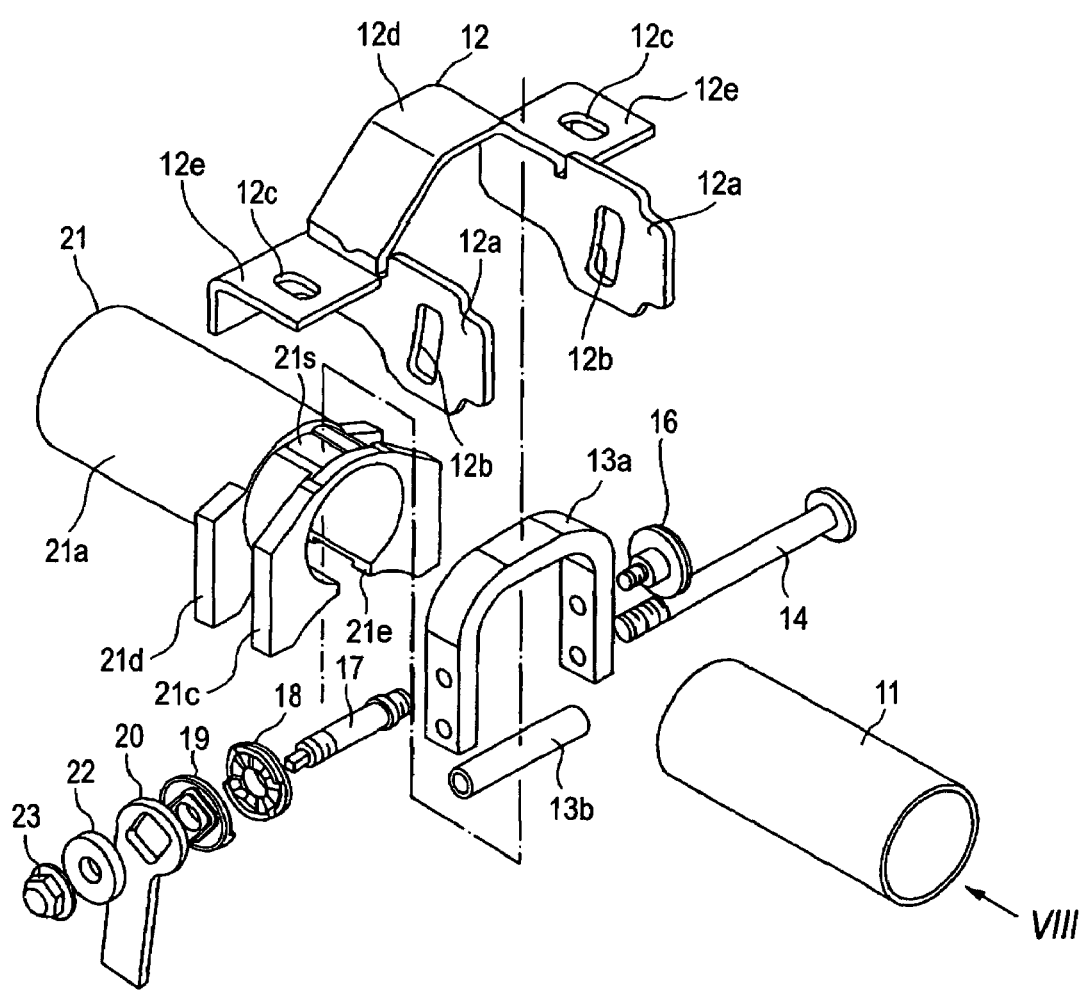
FIG. 3 is a partial perspective view of the steering apparatus shown in FIG. 1 in its exploded state.
Figure 4:
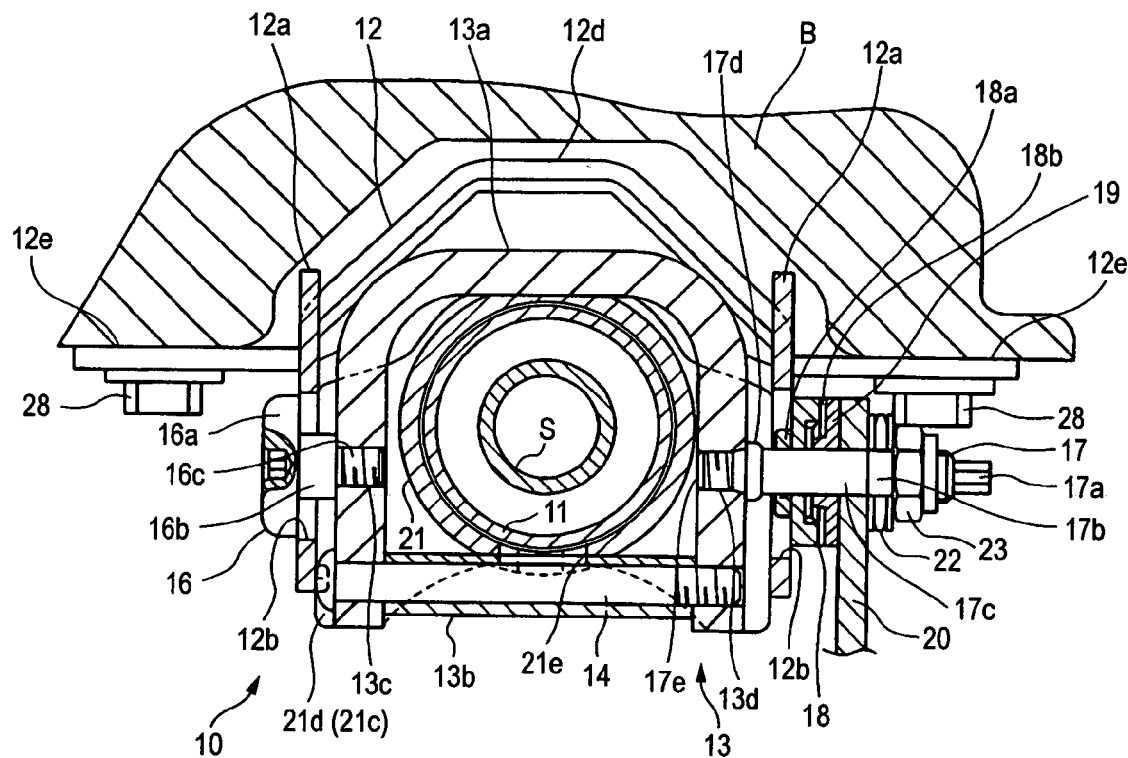
FIG. 4 is a view taken in line IV-IV in FIG. 1 and viewed in a direction of indicated arrows.

Now referring to the drawings, an explanation will be given of a tilt-telescopic steering apparatus according to an embodiment of this invention. FIG. 1 is a side view of a tilt-telescopic steering apparatus 10 according to an embodiment of this invention. FIG. 2 is a bottom view of the steering apparatus 10 shown in FIG. 1. FIG. 3 is a perspective view of the steering apparatus shown in FIG. 1 in its exploded state (a coil spring 30 is not shown). FIG. 4 is a view taken in line IV-IV in FIG. 1 when viewed in an arrow direction.

As seen from FIG. 2, an attached bracket 12 has a structure in which bracket segments 12a, 12a extending in parallel in a vertical direction are coupled by a coupling plate 12d, the bracket segments having a pair of body attaching holes 12c (formed in a pair of body attaching planes 12e, respectively) which are employed to attach the bracket 12 to a vehicle body B (FIG. 4) by bolts 28 (FIG. 4). The attached bracket 12 is made by bending a single plate material. The respective bracket segments 12a, 12a has equal plate thicknesses and shapes which are line-symmetrical with respect to a vertical line passing a steering axial line.

As seen from FIG. 4, a tension member 13 is arranged between the bracket segments 12a and 12a. The tension member 13 includes a sectional U shaped body 13a with its lower part opened and a tube 13b which is fixed to the body 13a by a bolt 14; the bolt 14 is bridged between the lower ends of both sides walls of the body 13a and inserted in the body 13a. The tension member 13 is attached to sandwich the outer periphery at the end of the outer jacket 21. Namely, the tension member 13 can be divided into the body 13a and the tube 13b, so that it is excellent in the assembling property when loaded in the vehicle. On the other hand, in the state where it is fixed by the bolt 14, the tension member 13 has a ring shape which is circumferentially continuous and hence provides high rigidity. Such a structure can be made by a smaller number of components. The bolt 14 may be a standard product. Further, the tube 13b can be made by only cutting a cylindrical tube in a predetermined length. Thus, the tension member 13 can be made at a lower cost. The tube 13b may be also made by welding a rolled plate material.

As seen from FIGS. 1 and 3, the outer jacket 21 includes a cylinder 21a and a pair of first plate-like flange 21c (near to the end) and second plate-like flanges 21d (far from the end) which are arranged axially apart to sandwich the tension member 13 on the outer periphery at the end of the cylinder 21a. The outer jacket 21 has an ear 21h formed at the upper position of the left end of the cylinder 21a in FIG. 1. The ear 21h has a through-hole 21i. Using a bolt (not shown) passed through the through-hole 21i and fixed to the vehicle body, the outer jacket 21 is swingably attached to the vehicle body 21. The cylinder 21a has a notch 21f having a triangular shape when viewed in direction indicated in FIG. 1 on the lower surface of the outer jacket 21 at a more forward position of the vehicle than the flanges 21c and 21d. The cylinder 21 a internally holds (incorporates) the inner column 11 on the lower surface of the outer jacket 21. The cylinder 21a is pivotally supported to the vehicle body (not shown) (vertically in FIG. 1) around a pivoting point O which accords with the axial line of the through-hole 21i. Between the flanges 21c and 21d functioning as the pressed portion, the tension member 13 is arranged. The cylinder 21a has an upper flat surface 21s between the flanges 21c and 21d so that the tension member 13a is stably mounted on the cylinder 21a. Incidentally, at the lower portion of the cylinder 21a, as seen from FIG. 2, a slit 21e is formed to extend axially across at least the flanges 21c and 21d from the end of the cylinder 21a. Regardless of this embodiment, the line connecting the centers of the fixing members 16 and 17 may cross the axial of the inner column 11.

A steering shaft S is internally passed through the cylindrical inner column 11 sheathed by the outer jacket 21, and rotatably supported by the inner column 11 by a bearing 29 (FIG. 1). The inner column 11 may have a long hole serving as a telescopic stopper formed in parallel to the axis of the steering shaft S and engaged with a bolt implanted in the outer jacket. However, this structure is not indispensable.

Each bracket segment 12a has a tilting groove 12b which serves as a part of the arc around a pivoting point O. As seen from FIG. 1, The tilting groove 12b is located at the position displaced backward of the vehicle in an axial line of the inner column from a body attaching hole 12c of the bracket 12 which is the body attaching portion arranged at a height near the axial line of the steering shaft S (see FIGS. 1 and 2). From the left side in FIG. 4, a fixing member 16 is passed through the tilting groove 12b. From the right side of in FIG. 4, a fixing member 17 is passed through the tilting groove 12b. Incidentally, the end of the bracket segment 12a on the side of the tilting groove 12b with respect to the body attaching hole 12c may be bent.

The fixing bolt 16 which is a headed bolt includes a disk-shaped head 16a which is larger than the width of the tilting groove 12b on the left side in FIG. 4 and has a tool engaging hole, a cylindrical tilt-guiding segment 16b which is guided in engagement in the tilting groove 12b, and a male screw 16c which is firmly screw-engaged in a screw hole 13c formed in the body 13a of the tension member 13.

On the other hand, the fixing member 17 includes a hexagonal head 17a to which a tool is to be engaged, a first screw segment 17b, a cylindrical shaft 17c, a small flange 17d and a second screw segment 17e. The second screw segment 17e is firmly screw-engaged in the screw hole 13d formed in the body 13a of the tension member 13 so that the small flange 17d is in contact with the surface 13a of the body 13. On the periphery of the shaft 17c arranged are a fixed cam 18 (which consists of a tilt-guiding segment 18a having an elliptical section engaged to the width of the tilting groove 12b and fixed cam segment 18b having a larger diameter than the width), a movable cam 19 having a cam face to be engaged to the fixed cam segment 18b, an operating lever 20 which rotates integrally to the fixed cam 19 and a thrust bearing (which may be a rolling or a sliding bearing) 22. These elements are attached to the shaft 17c by a nut which is firmly screw-engaged to the first screw segment 17b. Incidentally, the fixed cam 18, movable cam 19, bracket segments 12a, 12a function as an urging member. The fixed cam 18 and the movable cam 19 function as a displacement applying member. The fixing member 17, nut 23 and fixing member 16 function as a fixing member.

A coil spring 30 is arranged to surround the inner column 11 and to be secured, at its ends 30a, to the respective bracket segments 12a. The coil spring 30 has a pair of coil segments 30b on its both sides and a central contact segment 30c which is in contact with the lower surface of the inner column 11 exposed from the notch 21f of the outer jacket 21. The lower surface of the inner column 11 is, therefore, always urged upward by the urging force of the coil spring 30. Incidentally, a projection 21k is provided at the lowermost position of the notch 21f to prevent the coil spring 30 from coming off.

Figure 5:
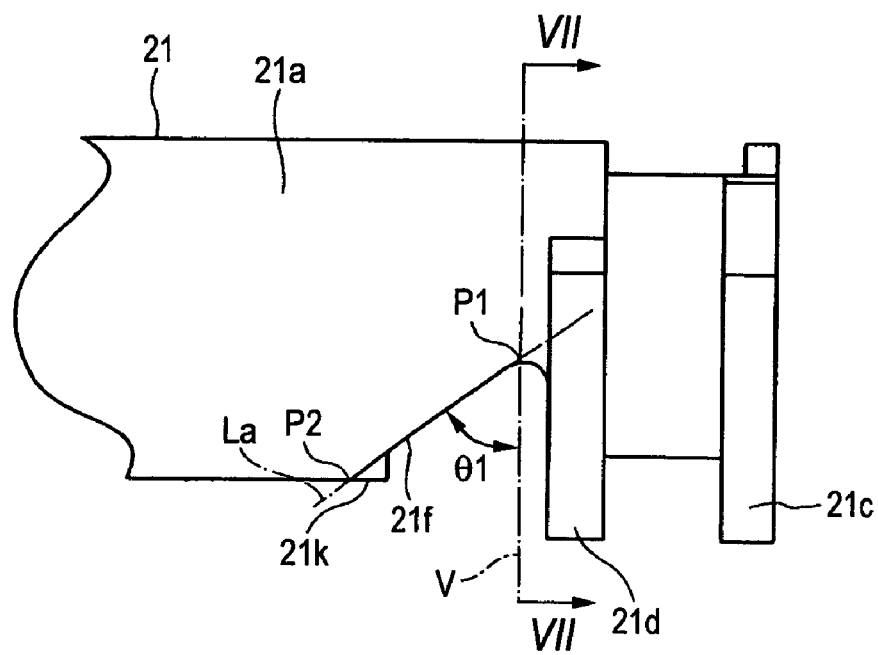
FIG. 5 is a side view of the flange side of an outer jacket when it is viewed from the side.
Figure 6:
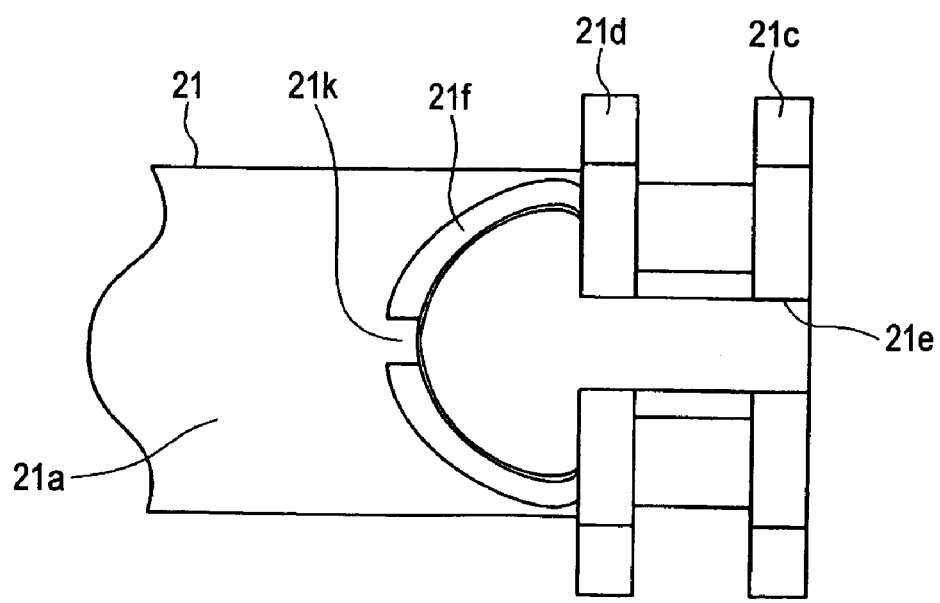
FIG. 6 is a bottom view of the flange side of an outer jacket when it is viewed from the bottom.
Figure 7:
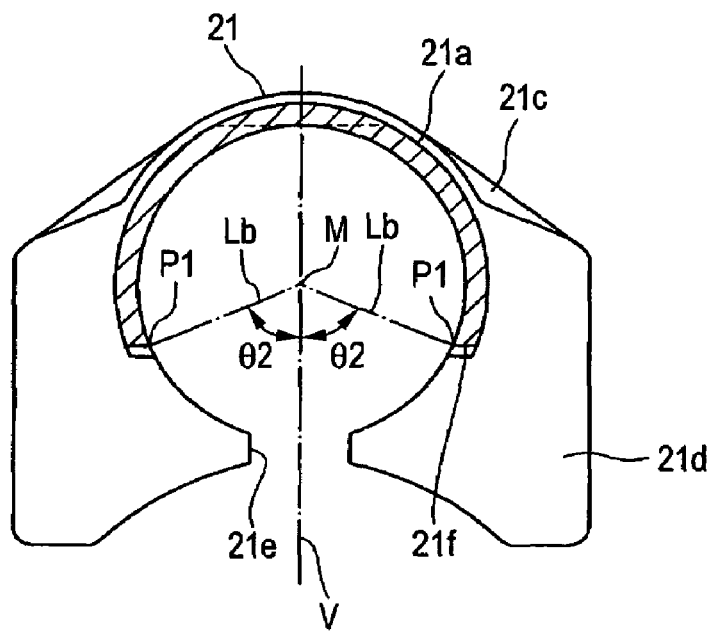
FIG. 7 is a view taken in line VII-VII in FIG. 5 and viewed in a direction of indicated arrows.

FIG. 5 is a side view of the flange side of the outer jacket 21 viewed from side (urging direction of the urging member). FIG. 6 is a bottom view of the flange side of the outer jacket 21 viewed from bottom. FIG. 7 is a view of the configuration taken in line VII-VII in FIG. 5 and viewed from the arrow direction. As seen from FIGS. 5 and 6, the notch 21f formed to be contiguous to the second flange segment 21d leads to a slit 21e which extends over the second flange 21d.

In the state shown in FIG. 5, the notch 21f has a tapered shape which expands toward an opening side (lower side). In this case, where the outer jacket 21 is superposed on the plane shown in FIG. 5, when a line La is drawn from the uppermost point P1 of the notch 21f to the lowermost point P2, the angle θ1 formed by the line La and vertical line V may be greater than 45°.

In the state shown in FIG. 7, it is assumed that the vertical line V passes the axial line of the outer jacket 21 and center of the slit 21e (it should be noted that this is not true when the outer jacket is actually installed on the vehicle body). On the section shown in FIG. 7, when a line Lb is drawn from the uppermost point P1 of the notch 21f to the axial line M, the angle θ2 formed by the line Lb and vertical line V may be smaller than 90°. However, if the angle θ2 is so small, the effect of alleviating stress concentration is attenuated. In this embodiment, the angle θ2 is set at 70 to 80°.

An explanation will be given of the adjusting operation of the steering apparatus according to this embodiment. When an operator rotates the operating lever 20 in a tightening direction, the concave portion of the fixed cam segment 18b of the fixed cam 18 in the fixing member 17 and the concave portion of the movable cam 19 are engaged to each other so that a force is generated in a direction leaving each other. At this time, the bracket segment 12a on the right side in FIG. 4 pressed by the fixed cam 18 shifts leftwards. On the other hand, the fixing member 17 pressed rightwards by the movable cam 19 shifts the tension member 14 rightwards. Correspondingly, the fixing member 16 also moves rightwards so that the inside of the tilting groove 12b is pressed to the sides of the flanges 21c and 21d to provide a suitable pressing force. Thus, the outer jacket 21 is secured to the bracket segment 12a, thereby stopping the displacement of the inner column 11 in the tilting direction.

On the other hand, since the bracket segment 12a on the right side in FIG. 4 pressed by the fixed cam 18 shifts leftwards on the basis of the rotation of the operating lever 20 in the tightening direction, it is brought into contact with the right half of the flanges 21c, 21d to be shifted leftward likewise. Further, the force given to the tension member 13 is transmitted to the fixing member 16 on the opposite side so that the bracket segment 12a on the left side in FIG. 4 shifts rightwards. Then, the bracket segment 12a on the left side is brought into contact with the left half of the flanges 21c, 21d to be shifted rightward likewise. Thus, pressing force is given to the outer periphery of the outer jacket 21. In this way, since the outer jacket 21 is pressed from both sides, the slit 21e is deformed so as to close. As a result, the inner diameter of the outer jacket 21 is reduced so that the inner column 11 can be held by a suitable force. Through the operation described above, the pair of bracket segments 12a of the bracket 12 are deformed to close.

In accordance with this embodiment, since the two bracket segments 12a have approximately the same shape and plate-thickness, i.e. equal bending elastic coefficients (i.e. rigidities), the bracket segments are subjected to the force approaching each other by the tightening operation of the operating lever 20 and are shifted by approximately equal quantities. Thus, the inner column 11 suffers from the pressing force from both left and right sides in FIG. 4 by the flanges 21c and 21d and hence is fixed so that its center accords with the position of dividing the distance between the bracket segments 12a, 12a into two. This stops the displacement in the telescopic direction of the inner column 11 and restrains the eccentricity of the steering shaft S.

As shown in FIG. 4, the attaching planes 12e are disposed at a height position that is in proximity of the height position of the axial line of the steering shaft S.

On the other hand, when the operator rotates the operating lever 20 in a loosening direction, in FIG. 4, the fixed cam 18 and the movable cam 19 are disengaged, in their convex portions, from each other so that they can be adjacent to each other. Thus, both bracket segments 12a leave each other so that the outer jacket 21 is located to be free from both bracket segments 12a. So the tilt-guiding segment 16b of the fixing member 16 and the tilt-guiding segment 18b of the fixed cam 18 can be shifted while they are guided along the tilt grooves 12b of the bracket segments 12a. Further, owing to reduction in the tightening force of the outer jacket 21, the inner column 11 can be shifted in the axial direction (placed in a state where it is shiftable in the axial direction) so that the tilting direction and telescopic direction of the inner column can be optionally adjusted.

In this case, in order to make the telescopic adjustment, a certain gap is required between the inner periphery of the outer jacket 21 and the inner periphery of the inner column 11. However, when the operating lever 20 is rotated in the loosening direction, the presence of the gap is transmitted as a backlash of the steering wheel to the operator. At this time, the operator may feel incongruous sense. On the other hand, in accordance with this embodiment, owing to the urging force of the coil spring 30 with their ends secured to the bracket segments 12a, the inner column 11 is always urged upward. Thus, owing to such an urging force, the outer peripheral surface of the inner column 11 is pressed on the inner periphery surface of the outer jacket 21 so that the backlash can be excluded, thereby avoiding giving incongruous sense to the operator. Incidentally, the coil-spring 30 has a function of hooking the inner column 11 at a medium position of tilting by the use of its urging force during the tilt adjustment so that the steering shaft S does not swing downward owing to the weight of the steering wheel (not shown).

Further, in this embodiment, since the outer jacket 21 has the slit 21e, the end rigidity of the outer jacket 21 is reduced so that the diameter of the outer jacket 21 can be easily decreased, thereby enhancing the holding force of the inner column 11. Further, as seen from FIGS. 5 to 7, since the notch 21f having the suitable shape are provided, the stress concentration when the flanges 21c and 21d are urged by the bracket segments 12a, 12a can be alleviated, thereby effectively restraining the large-scaling of the outer jacket 21.

Figure 8:
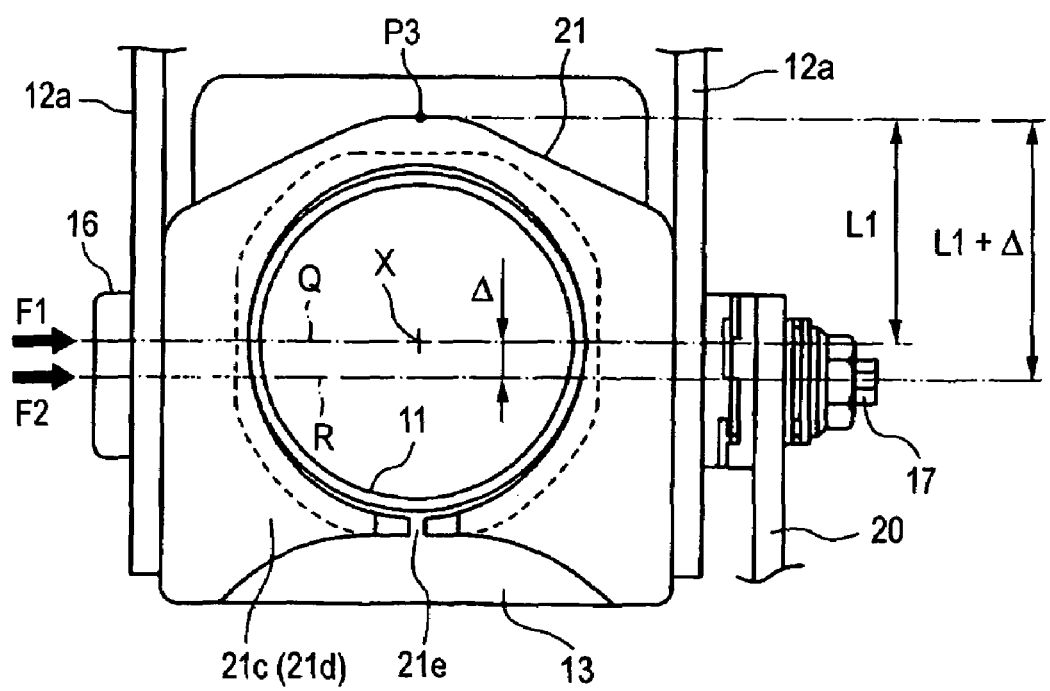
FIG. 8 is a side view of a tilt-telescopic steering apparatus according to an embodiment of this invention in an assembled state when viewed in a direction of arrow VIII indicated in FIG. 3.

FIG. 8 is a view of the tilt-telescopic steering apparatus according to this embodiment in an assembled state viewed in the arrow VIII in FIG. 3. As seen from FIG. 8, in this embodiment, the line coupling the centers of the fixing members 16 and 17 is apart from the axial line X of the inner column 11. Concretely, assuming that the pressing force necessary to hold the inner column 11 given by the fixing members 16 and 17 is F1, the pressing force F2 necessary to hold the inner column 11 given by the fixing members 16 and 17 in this embodiment in which the line R coupling the centers of the fixing members 16 and 17 is shifted by distance Δ downward from the axial line X of the inner column 11 in FIG. 8 is expressed by $$F2=(L1/(L1+\Delta))\cdot F1$$

{where L1 represents the distance from point P3 from the axial line X of the inner column 11}. Since L1<L1+Δ, in accordance with this embodiment, the inner column 11 can be held by the smaller pressing force F2 by the theory of leverage.

Figure 9:
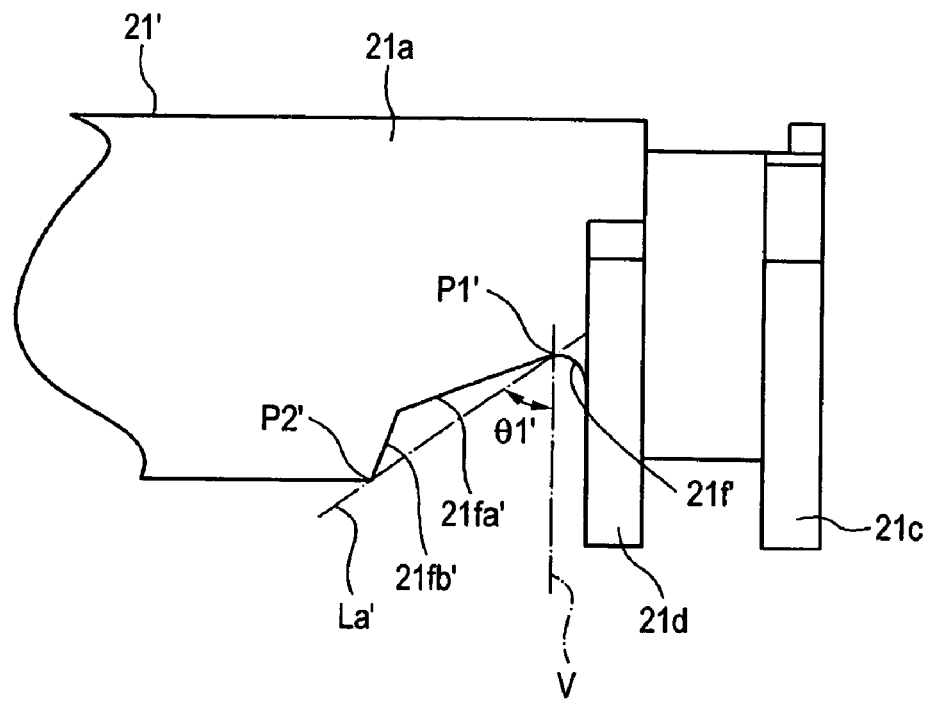
FIG. 9 is a side view of an outer jacket similar to FIG. 5 according to a modification.

FIG. 9 is a side view of an outer jacket 21' according to a modification of this invention which is similar to FIG. 5. In this modification, only the shape of a notch 21f' is different from the embodiment of FIG. 5. Concretely, when the outer jacket 21' is viewed from the side, the slope of the notch 21f' is bent to include a gentle segment 21fa' and a steep segment 21fb'. In this modification also, it should be noted that when the outer jacket 21' is superposed on the plane shown in FIG. 9, the angle formed by the vertical line V and the straight line La' drawn from the uppermost point P1' of the notch 21f' to the lowermost point P2' is larger than 45°.

Figure 10:
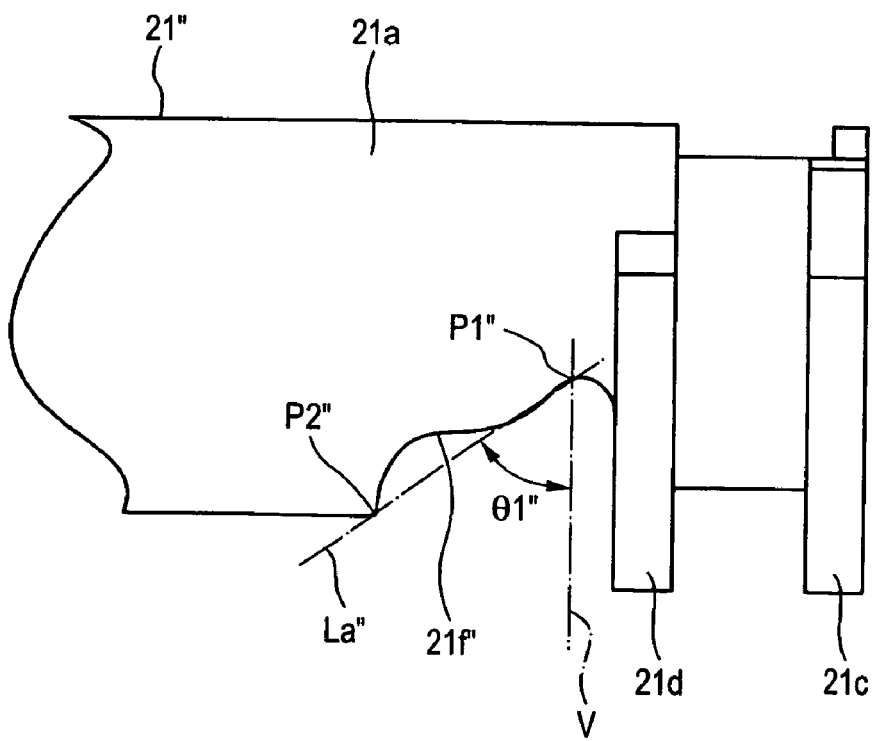
FIG. 10 is a side view of an outer jacket similar to FIG. 5 according to another modification.

FIG. 10 is a side view of an outer jacket 21" according to a modification of this invention which is similar to FIG. 5. In this modification, only the shape of a notch 21f" is different from the embodiment of FIG. 5. Concretely, when the outer jacket 21" is viewed from the side, the slope of the notch 21f' includes a plurality of arcs. In this modification also, it should be noted that when the outer jacket 21' is superposed on the plane shown in FIG. 9, the angle formed by the vertical line V and the straight line La' drawn from the uppermost point P1" of the notch 21f" to the lowermost point P2" is larger than 45°.

Figure 11:
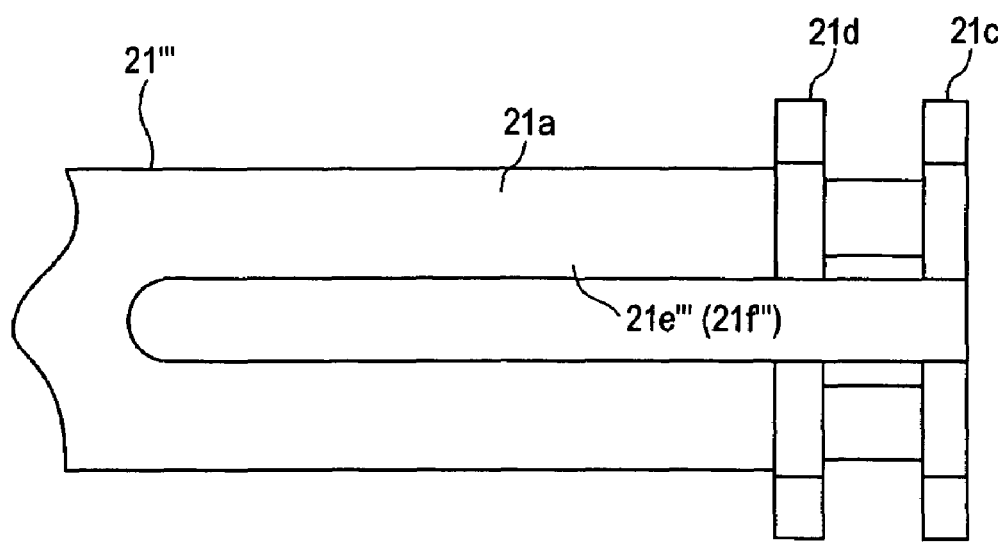
FIG. 11 is a bottom view of an outer jacket.

Incidentally, the shape of the notch of the outer jacket should not be limited to those described above. For example, in a bottom view of an outer jacket 21''' shown in FIG. 11, the notch 21f''' can be regarded as an extension of a slit 21e'''. In such a case, however, the function of alleviating the stress concentration is attenuated so that the notch 21f''' is preferably made as long as possible. As the case may be, the notch 21f''' may be extended along the entire length of the outer jacket 21'''.

Figure 12:
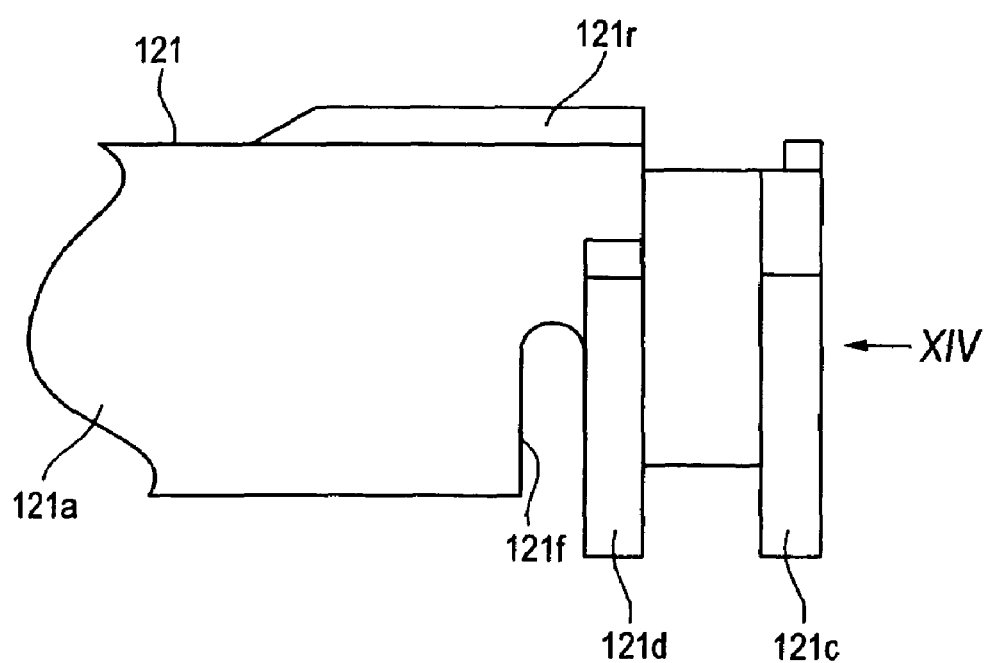
FIG. 12 is a side view of the flange side of an outer jacket according to a second embodiment of this invention when it is viewed from the side.
Figure 13:
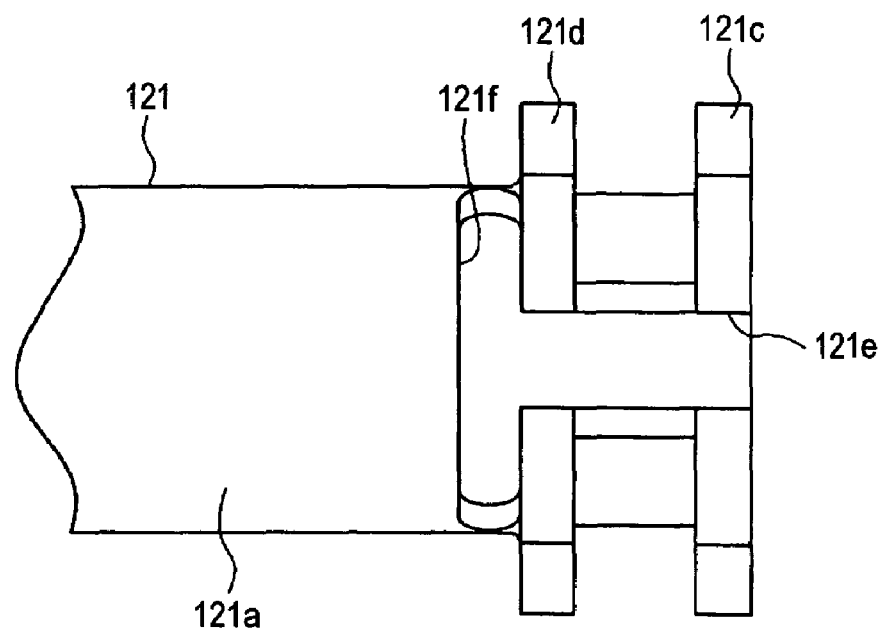
FIG. 13 is a bottom view of the flange side of an outer jacket according to a second embodiment of this invention when it is viewed from the bottom.
Figure 14:
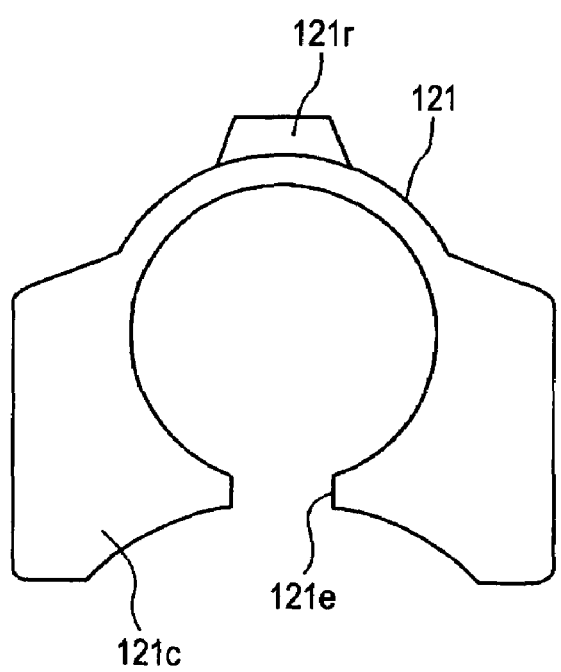
FIG. 14 is a view when viewed in an indicated XIV direction in FIG. 12.

FIG. 12 is a side view of the flange side of an outer jacket 121 viewed from side according to a second embodiment of this invention. FIG. 13 is a bottom view of the flange side of the outer jacket 121 viewed from bottom according to the second embodiment. FIG. 14 is a view of the configuration taken in line XIV-XIV in FIG. 11.

In this embodiment, the notch 121f which leads to a slit 121e, unlike the embodiment described above, has a shape which is narrow in the width in the axial direction. On the outer periphery of the outer jacket 121 opposite to the slit 121e, a rib 121r extending in the axial direction is provided. The provision of such a rib 121r serves to reinforce the portion which is fragile for the stress concentration due to narrowing the width of the notch 121f, thereby restraining possibility of large-scaling the outer jacket 21. The rib 121r may be adopted together with the notch having the shape shown in FIG. 5, 9 or 11. Incidentally, the sectional shape of the rib 121r in this embodiment should not be limited to a trapezoid shown in FIG. 14, but may be any shape such as a rectangular or semi-circular shape capable of restraining the interference with a peripheral component(s). The remaining structure, which may be identical to that in the embodiment described above, will not be explained here.

Figure 15:
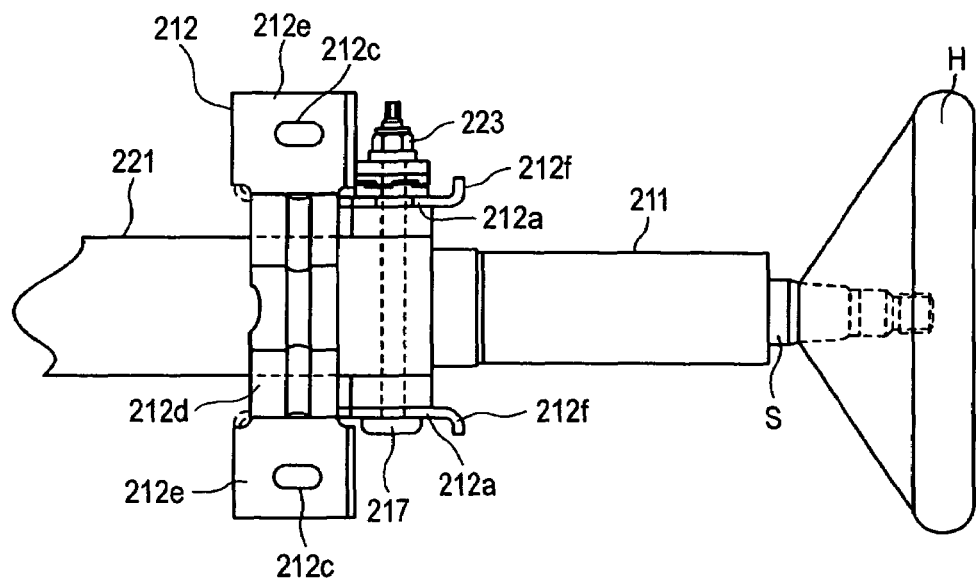
FIG. 15 is a top view of a tilt-telescopic steering apparatus according to a third embodiment of this invention.
Figure 16:
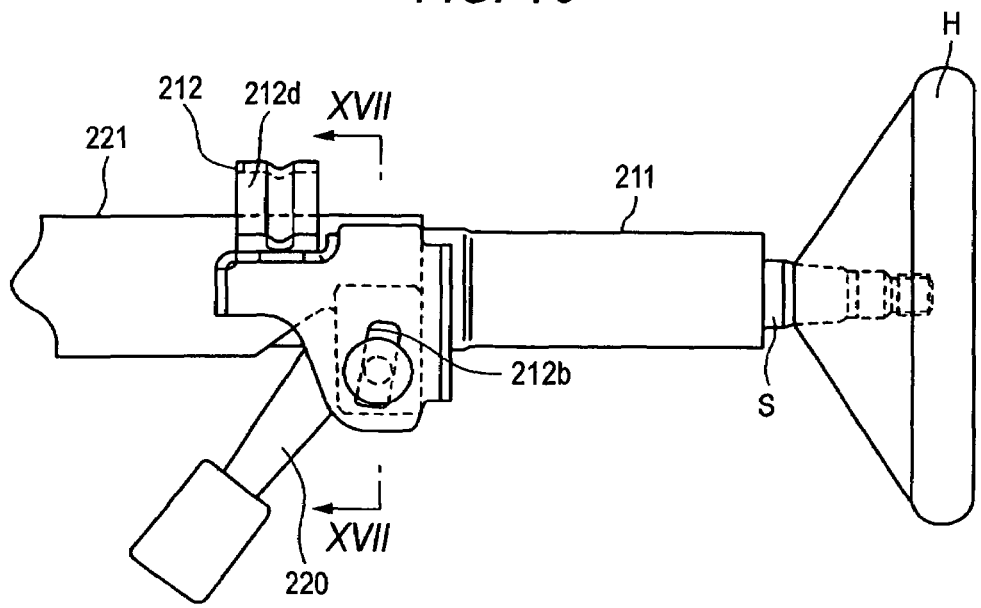
FIG. 16 is a side view of a tilt-telescopic steering apparatus according to a third embodiment of this invention.
Figure 17:
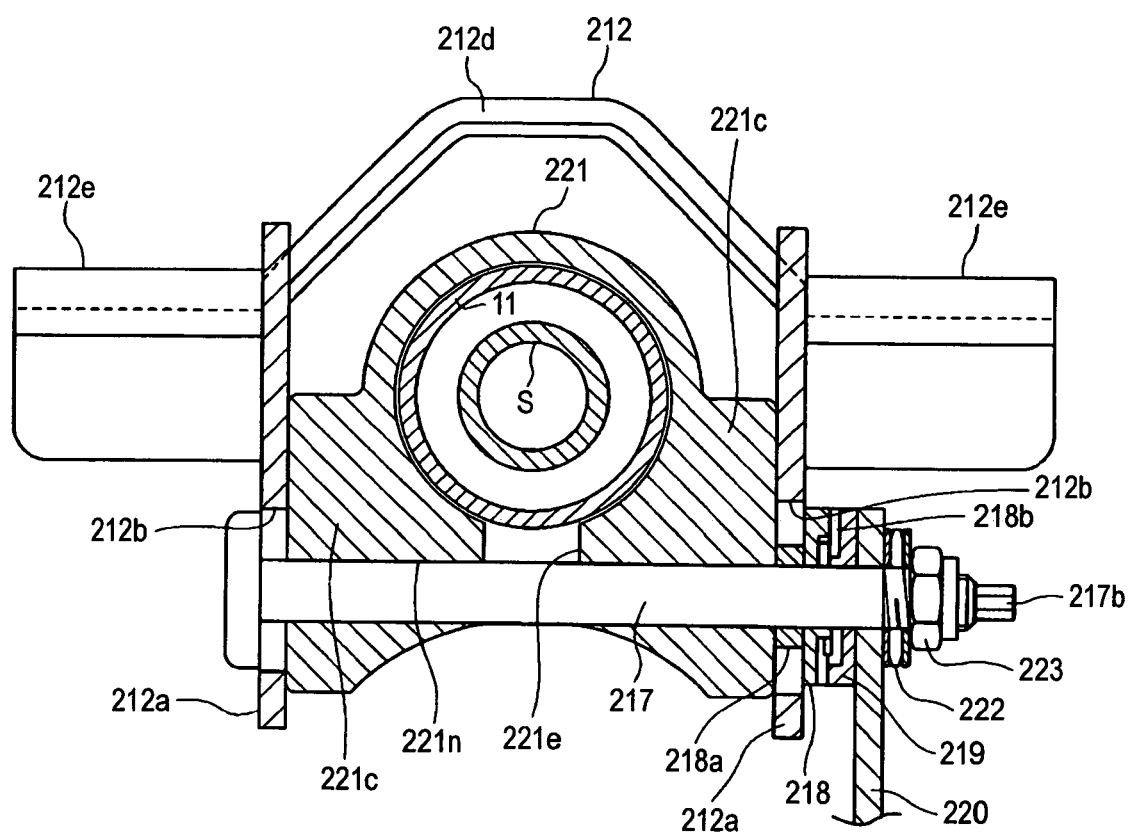
FIG. 17 is a view taken in line XVII-XVII in FIG. 16 and viewed in a direction of indicated arrows.

FIG. 15 is a top view of a tilt-telescopic steering apparatus according to a third embodiment of this invention. FIG. 16 is a side view of a tilt-telescopic steering apparatus according to the third embodiment. FIG. 17 is a view taken in line XVII-XVII in FIG. 16 when viewed in the arrow direction.

In FIG. 15, an inner column 11 shiftable in an axial direction is arranged within an outer jacket 221 is attached to a vehicle body (not shown) through a bracket 212. A steering shaft S is arranged within the inner column 11. To the right end of the steering shaft S in FIG. 15, a steering wheel H is attached. Although not shown, the left end of the steering shaft S is coupled with a pinion (tooth-engaged with the rack shaft of the steering apparatus) through e.g. a universal joint. Incidentally, the outer jacket 221 may incorporate a power unit for assisting steering power by supplying assisting power of an electric motor to the steering shaft.

As seen from FIGS. 15 to 17, an attached bracket 12 has a structure in which bracket segments 212a, 212a extending in parallel in a vertical direction are coupled by a coupling plate 212d, the bracket segments having a pair of body attaching holes 212c (formed in a pair of body attaching planes 12e, respectively) which are employed to attach the bracket 12 to a vehicle body (not shown). The attached bracket 12 is made by bending a single plate material or welding a plurality of plate materials. The respective bracket segments 212a, 212a has equal plate thicknesses and shapes which are line-symmetrical with respect to a vertical line passing a steering axis. Each bracket segment 212a has a tilting groove 212b which serves as a part of the arc around the pivoting point (not shown) of the outer jacket 221. Incidentally, as seen from FIG. 15, the body attaching hole 212c is displaced backward of the vehicle from the axial line of a fixing member 217 (described later) in the axial line of the inner column 11. The end 212f of the bracket segment 212a on the side of the tilting groove 212b with the body attaching hole 212c is bent to improve the rigidity.

As seen from FIG. 17, the outer jacket 221 is arranged between the bracket segments 212a and 212a. At the lower portion of the outer jacket 221, a slit 221e is formed to extend in the axial direction. A through-hole 221n is formed to cross the slit 221e.

The fixing member 217, which is headed, inserted into the tilting groove 212b of the bracket segment 212b from the left side in FIG. 17 is passed through the through-hole 221n formed in the bracket segment 212a on the left side in FIG. 17 and the outer jacket 221 and projects from the tilting groove 212b on the opposite side.

On the periphery of the projecting portion of the fixing member 217 arranged are a fixed cam 218 (which consists of a tilt-guiding segment 18a having an elliptical section engaged to the width of the tilting groove 212b and fixed cam segment 218b having a larger diameter than the width), a movable cam 219 having a cam face to be engaged to the fixed cam segment 218b, an operating lever 220 which rotates integrally to the fixed cam 219 and a thrust bearing 222 (which may be a rolling or a sliding bearing). These elements are attached to the above projecting portion by a nut which is firmly screw-engaged to the screw portion 217b of the fixing member 217. Incidentally, the fixed cam 218, movable cam 219, bracket segments 212a, 212a constitute an urging member defined in claims. The fixing member 17, nut 23 and fixing member 16 functions as a fixing member.

Figure 18:
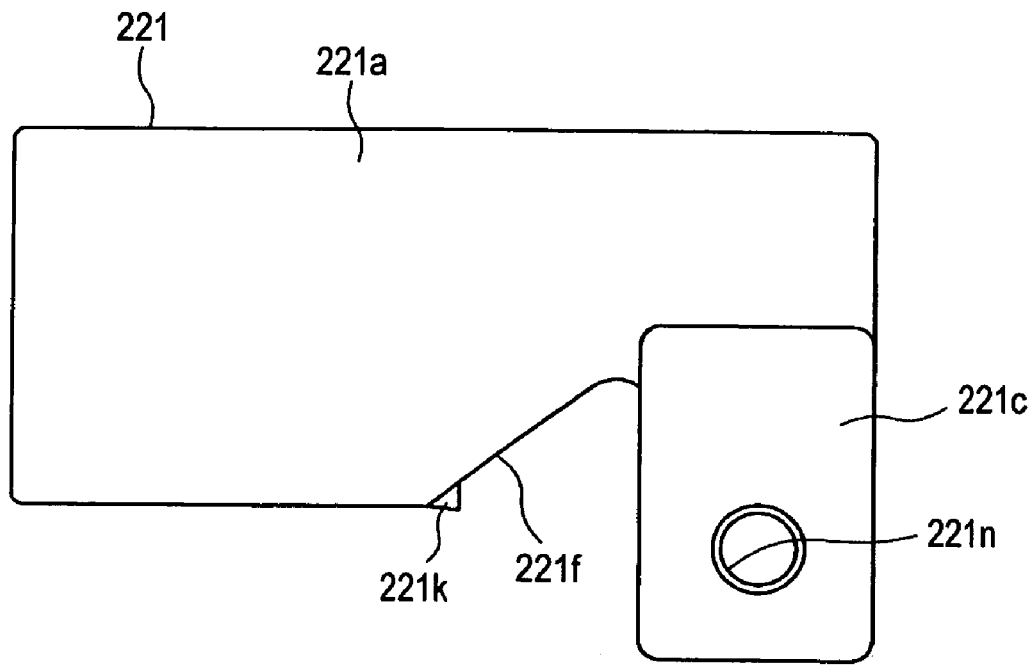
FIG. 18 is a side view of an outer jacket when viewed from the side.
Figure 19:
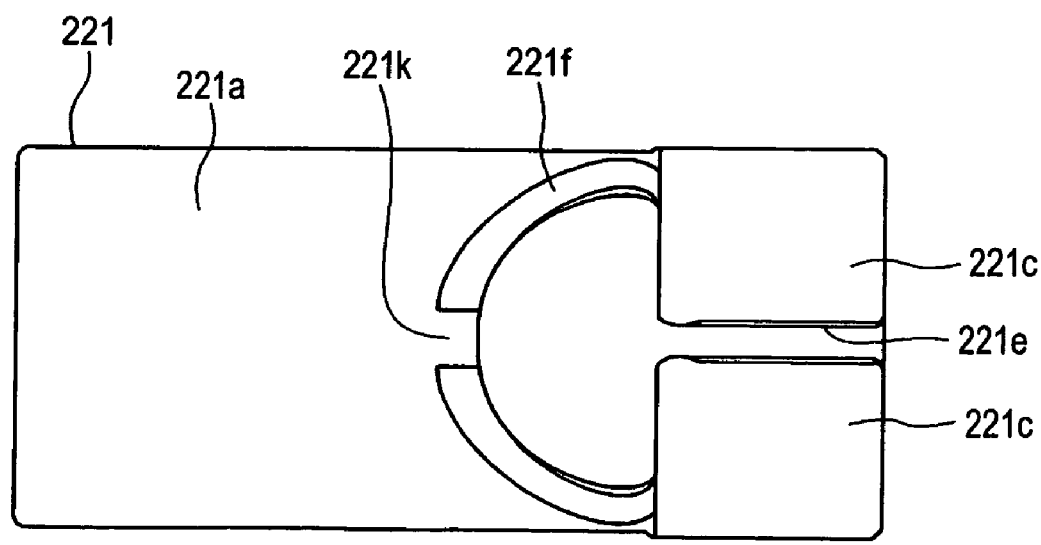
FIG. 19 is a bottom view of an outer jacket when viewed from the bottom.

FIG. 18 is a side view of the outer jacket 221 viewed from the side. FIG. 19 is a bottom view of the outer jacket 221 viewed from the bottom. Referring to FIGS. 18, 19 and 17, the outer jacket 221 has, on the right end side thereof in FIG. 18 (on the side of the steering wheel side), pressing segments 221c which extend in a radial direction from the lower half of the outer periphery of the cylindrical portion 221a of the outer jacket 221 and are kept in contact with the bracket segments 212a, 212a. Recess 221f formed to be adjacent to the pressing segments 221c lead to a slit 221e which extends over the pressing segments 221c.

In the state shown in FIG. 18, the notch 221f has a tapered shape which expands toward the opening side (lower side). Such a shape of the notch 221 is similar to that in the embodiment shown in FIG. 5.

An explanation will be given of the adjusting operation of the steering apparatus according to this embodiment. When an operator rotates the operating lever 220 in a tightening direction, as in the embodiment described above, by the interaction between the fixed cam 218 and the movable cam 219, the outer jacket 221 is urged in a direction of closing the slit 221e through the bracket segments 212a, 212a. Thus, the inner diameter of the outer jacket 221 is reduced to sandwich the inner column 11, thereby stopping movement of the inner column 11 in the tilting direction and telescopic direction (placed in the state where the inner column in the axial direction is not shiftable/adjustable).

On the other hand, when the operator rotates the operating lever 220 in a loosening direction, inversely to the above direction, the outer jacket 221 is deformed in the direction of opening the slit 221e. Thus, the inner diameter of the outer jacket 221 is increased, thereby allowing movement of the inner column 11 in the telescopic direction (placed in the state where the inner column in the axial direction is shiftable/adjustable). The friction force between the outer jacket 221 and the brackets 212a, 212a is attenuated so that the movement of the inner column 211 along the tiling grooves 212b in the tilting direction is also allowed.

In accordance with this embodiment, since the outer jacket 221 has the slit 221e, the end rigidity of the outer jacket 221 is reduced so that the diameter of the outer jacket 221 can be easily decreased, thereby enhancing the holding force of the inner column 11. Further, as seen from FIGS. 18 and 19, since the notch 221f having the suitable shape are provided, the stress concentration when the pressing segments 221c are urged by the bracket segments 12a, 12a can be alleviated, thereby effectively restraining the large-scaling of the outer jacket 221.

Figure 20:
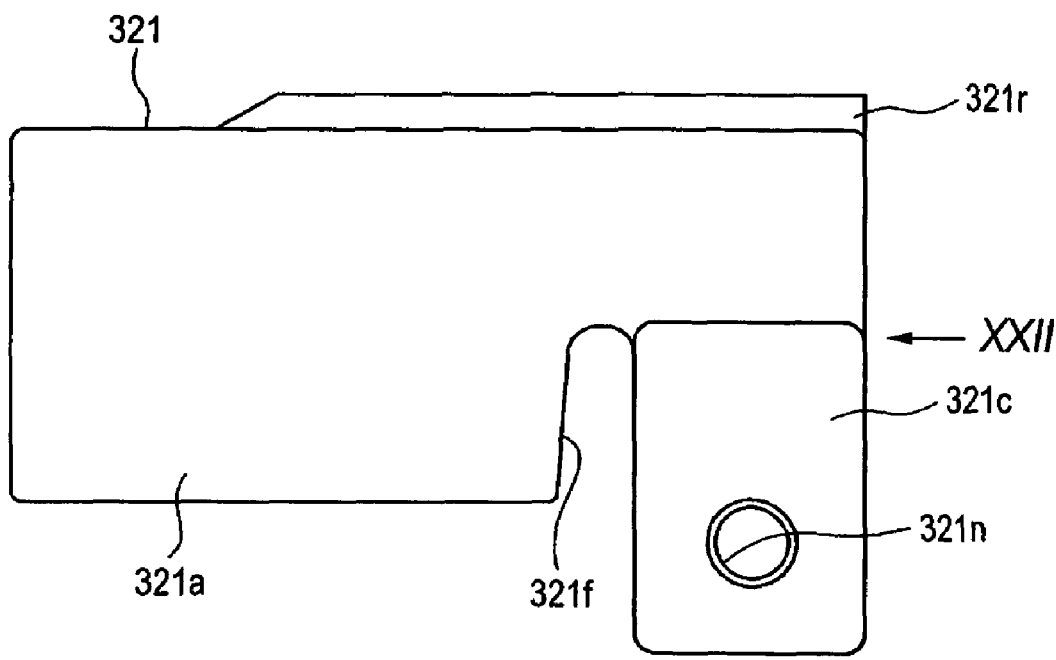
FIG. 20 is a side view of an outer jacket according to a fourth embodiment of this invention when viewed from the side.
Figure 21:
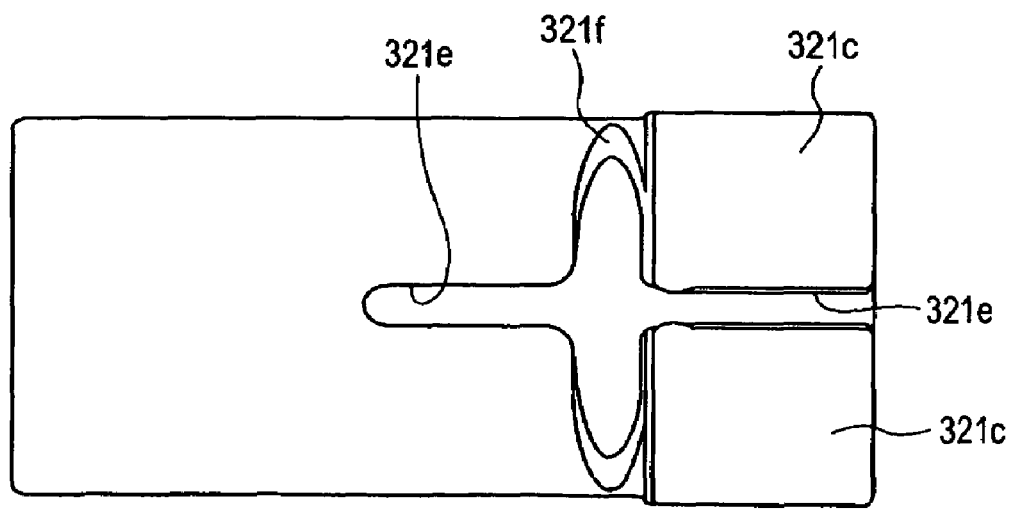
FIG. 21 is a bottom view of an outer jacket 321 according to a fourth embodiment of this invention when viewed from the bottom.
Figure 22:
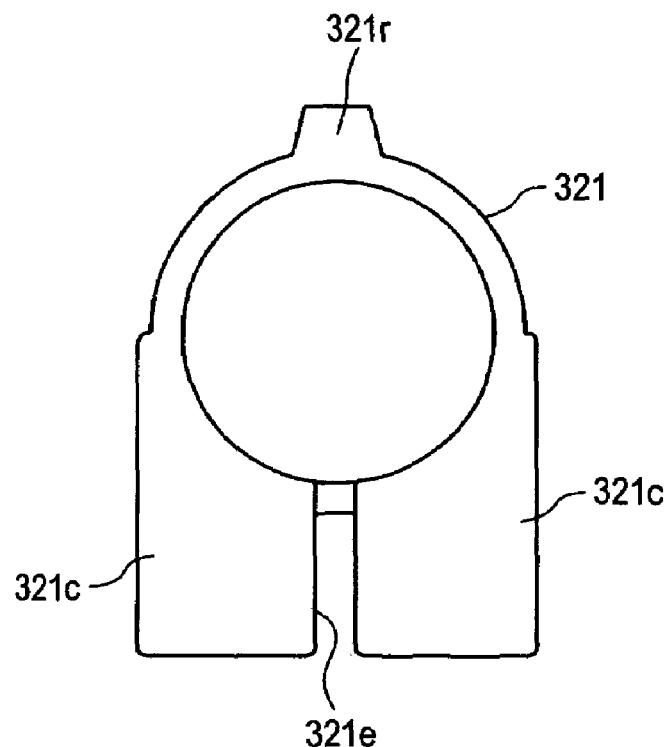
FIG. 22 is a view when viewed in a direction of arrow XXII indicated in FIG. 20.

FIG. 20 is a side view of an outer jacket 321 viewed from the side. FIG. 21 is a bottom view of the outer jacket 321 viewed from the bottom. FIG. 22 is a view when viewed in arrow XXII in FIG. 20.

In this embodiment, unlike the embodiment illustrated in FIGS. 18 and 19, the notch 321f, unlike the embodiment described above, has a shape which is narrow in the width in the axial direction. A slit 321e extends in the axial direction to cross the notch 321f. On the outer periphery of the outer jacket 321 opposite to the slit 321e, a rib 321r extending in the axial direction is provided. The provision of such a rib 321r serves to reinforce the portion which is fragile for the stress concentration due to narrowing the width of the notch 321f, thereby restraining possibility of large-scaling the inner column 11. The rib 321r may be adopted together with the notch having the shape shown in FIG. 18 and others. Incidentally, the sectional shape of the rib 321r in this embodiment should not be limited to a trapezoid shown in FIG. 22, but may be any shape such as a rectangular or semi-circular shape which restrains the interference with a peripheral component(s). The remaining structure, which may be identical to that in the embodiment shown in FIGS. 15 to 19, will not be explained here.

Figure 23:
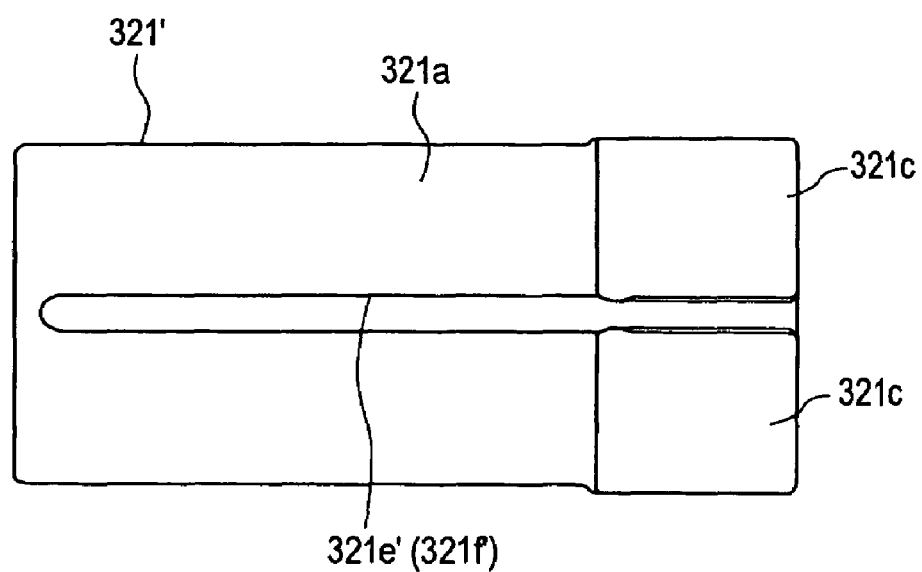
FIG. 23 is a bottom view of an outer jacket.

Incidentally, the shape of the notch of the outer jacket should not be limited to those described above. For example, in a bottom view of an outer jacket 321 shown in FIG. 23, the notch 321f can be regarded as an extension of a slit 321. In such a case, however, the function of alleviating the stress concentration is attenuated so that the notch 321f is preferably made as long as possible. As the case may be, the notch 321f may be extended along the entire length of the outer jacket 321'.

The detailed explanation has been hitherto given of this invention with reference to the various embodiments. This invention should not be construed to be limited to the embodiments, but can be modified or improved without departing from the sprit of this invention. For example, in the above embodiments, although the slit was located on the lower side of the outer jacket, the slit may be located at the upper side of the outer jacket. In this case, the sectional shape of the flange is upside down from the case in the above embodiments. In the embodiments, although the outer jacket was arranged on the lower side whereas the inner column was arranged on the upper side, a layout may be adopted in which the outer jacket was arranged on the upper side whereas the inner column was arranged on the lower side.

According to an embodiment of the invention, the outer jacket includes a pressed portion which extends in a direction leaving the axial line from the outer periphery of the outer jacket and is urged by the urging member, a slit which extends in the axial line direction over the pressed portion from the end of the outer jacket, and a notch which leads to the slit extending over the pressed portion; and the notch has a tapered shape which enlarges toward the opening side when the outer jacket is viewed in an urging direction of the urging member. In this configuration, since the outer jacket has the slit, the rigidity of the outer jacket is reduced so that the diameter of the outer jacket can be easily decreased. Further, since the notch is provided, stress concentration when the pressed portion is urged by the urging member can be alleviated, thereby effectively restraining the large-scaling of the outer jacket. In addition, since the notch has a tapered shape which enlarges toward the opening side, even when the outer jacket is largely deformed, the possibility of its large-scaling can be restrained.

According to an embodiment of the invention, the outer jacket includes a pressed portion which extends in a direction leaving an axial line from the outer periphery of the outer jacket and is urged by the urging member, a slit which extends in the axial line direction over the pressed portion from the end of the outer jacket, a notch which leads to the slit extending over the pressed portion and a rib extending in the axial direction on the outer periphery opposite to the slit with respect to the axial line of the outer jacket. In this configuration, since the outer jacket has the slit, the rigidity of the outer jacket is reduced so that the diameter of the outer jacket can be easily decreased. Further, since the notch is provided, stress concentration when the pressed portion is urged by the urging member can be alleviated, thereby effectively restraining the large-scaling of the outer jacket. In addition, since the rib extending in the axial direction is provided on the outer periphery opposite to the slit with respect to the axial line, the portion which is fragile for the stress is reinforced, thereby restraining possibility of large-scaling the outer jacket.

Preferably, the center of the slit is at an angle of 0° on the section orthogonal to the axial line of the outer jacket, the notch is formed within a range of ±90° from the center of the slit. Such a configuration serves to further restrain the possibility of large-scaling the outer jacket.

According to an embodiment of the invention, the outer jacket includes the flange which extends in a direction leaving the axial line from the outer periphery of the outer jacket and is pressed by the pair of bracket segments, a slit which extends in the direction of the axial line from the end of the outer jacket to cross the flange and a notch which leads to the slit extending over the pressed portion; and the notch has a tapered shape which enlarges toward the opening side when the outer jacket is viewed from the bracket segments. In this configuration, since the outer jacket has the slit, the rigidity of the outer jacket is reduced so that the diameter of the outer jacket can be easily decreased. Further, since the notch is provided, stress concentration when the flange is urged by the bracket segments can be alleviated, thereby effectively restraining the large-scaling of the outer jacket. In addition, since the notch has a tapered shape which enlarges toward the opening side, even when the outer jacket is largely deformed, the possibility of its large-scaling can be restrained.

According to an embodiment of the invention, the outer jacket includes the flange which extends in a direction leaving the axial line from the outer periphery of the outer jacket and is pressed by the pair of bracket segments, a slit which extends in the axial direction from the end of the outer jacket to cross the flange, a notch which leads to the slit extending over the pressed portion and a rib extending in the axial direction on the outer periphery opposite to the slit with respect to the axial line of the outer jacket. In this configuration, since the outer jacket has the slit, the rigidity of the outer jacket is reduced so that the diameter of the outer jacket can be easily decreased. Further, since the notch is provided, stress concentration when the flange is urged by the bracket segments can be alleviated, thereby effectively restraining the large-scaling of the outer jacket. In addition, since the rib extending in the axial direction is provided on the outer periphery opposite to the slit with respect to the axial line, the portion which is fragile for the stress is reinforced, thereby restraining possibility of large-scaling the outer jacket.

Preferably, the center of the slit is at an angle of 0° on the section orthogonal to the axial line of the outer jacket, the notch is formed within a range of ±90° from the center of the slit. Such a configuration serves to further restrain the possibility of large-scaling the outer jacket.

What is claimed is:

1. A steering apparatus comprising:
an inner column which rotatably supports a steering shaft;
an outer jacket which incorporates the inner column shiftably in an axial direction, at least a portion of the outer jacket being cylindrical; and
an urging member for urging the inner column;
wherein the outer jacket includes:
a pressed portion which extends in a direction leaving an axial line from the outer periphery of the outer jacket and is urged by the urging member,
a slit which extends in the axial direction over the pressed portion from the end of the outer jacket, and
a notch which leads to the slit extending over the pressed portion; and
the notch has a tapered shape which enlarges toward an opening side when the outer jacket is viewed in an urging direction of the urging member.

2. The steering apparatus according to claim 1,
wherein, assuming that the center of the slit is at an angle of 0° on the section orthogonal to the axial line of the outer jacket, the notch is formed within a range of ±90° from the center of the slit.

3. A steering apparatus for supporting a steering shaft attached to a steering wheel shiftably in an axial direction, comprising:
an inner column which rotatably supports the steering shaft;
a pair of bracket segments attached to a vehicle body and arranged at opposite positions with respect to an axial line of the steering shaft;
a tension member extended between the pair of bracket segments;
two fixing members for fixing the tension member from outside of the pair of bracket segments;
a displacement applying member arranged between the tension member and one of the fixing members for applying a relative displacement between the bracket segments and the fixing members in interlock with a movement of an operating lever; and
a cylindrical outer jacket held to the vehicle body by coupling the tension member, the bracket segments and the fixing member and having a flange with an outer periphery to be in contact with the bracket segments by the relative displacement of the bracket segments at least between the pair of bracket segments, and an inner periphery wrapping the outer periphery of the inner column;
wherein the pair of bracket segments approach each other by the relative displacement given by the applying member so that a pressing force is given to the inner column through the flange of the outer jacket and the inner column is held at its axial position by the bracket segments through the outer jacket;
the outer jacket includes the flange which extends in a direction leaving the axial line from the outer periphery of the outer jacket and is pressed by the pair of bracket segments, a slit which extends in the axial direction from the end of the outer jacket to cross the flange, and a notch which leads to the slit extending over the pressed portion; and
the notch has a tapered shape which enlarges toward the opening side when the outer jacket is viewed from the bracket segments.

4. The steering apparatus according to claim 3,
wherein, assuming that the center of the slit is at an angle of 0° on the section orthogonal to the axial line of the outer jacket, the notch is formed within a range of ±90° from the center of the slit.

* * * * *